(12) United States Patent
Tanaka et al.

(10) Patent No.: US 11,150,750 B2
(45) Date of Patent: Oct. 19, 2021

(54) ELECTRONIC PEN AND ELECTRONIC PEN MAIN BODY UNIT

(71) Applicant: Wacom Co., Ltd., Saitama (JP)

(72) Inventors: Kohei Tanaka, Saitama (JP); Kenichi Ninomiya, Saitama (JP); Takenori Kaneda, Saitama (JP); Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/938,496

(22) Filed: Jul. 24, 2020

(65) Prior Publication Data

US 2020/0356192 A1    Nov. 12, 2020

Related U.S. Application Data

(63) Continuation of application No. PCT/JP2018/043543, filed on Nov. 27, 2018.

(30) Foreign Application Priority Data

Feb. 23, 2018   (JP) ............................... JP2018-30529

(51) Int. Cl.
*G06F 3/0354*    (2013.01)
*B43K 5/16*    (2006.01)

(52) U.S. Cl.
CPC ............ *G06F 3/03545* (2013.01); *B43K 5/16* (2013.01)

(58) Field of Classification Search
CPC .............................. G06F 3/03545; B43K 5/16
(Continued)

(56) References Cited

U.S. PATENT DOCUMENTS 5,781,661 A * 7/1998 Hiraiwa ............. G06K 9/00154
382/107
2002/0181744 A1* 12/2002 Vablais ............... G06F 3/03545
382/107
(Continued)

FOREIGN PATENT DOCUMENTS

JP          2-143636 U     12/1990
JP          7-509575 A     10/1995
(Continued)

OTHER PUBLICATIONS

Extended European Search Report, dated Dec. 15, 2020, for European Application No. 18907146.7, 9 pages.
(Continued)

*Primary Examiner* — Mark Edwards
(74) *Attorney, Agent, or Firm* — Seed IP Law Group LLP (57) ABSTRACT

An electronic pen main body unit of an electronic pen having a function of a fountain pen includes an ink writing unit in which a cartridge housing liquid ink is fitted to a rear end portion of a pen core, and a pen body is disposed so as to be superposed on the pen core in a direction orthogonal to a coupling direction of the pen core and the cartridge, and an interaction circuit having an electronic part which, in operation, exchanges a signal with a tablet. The interaction circuit is disposed on a side of the pen core opposite the pen body in the direction orthogonal to the coupling direction of the pen core and the cartridge in a state in which the interaction circuit recedes to the cartridge side from a writing end of the pen body in the coupling direction of the pen core and the cartridge.

20 Claims, 9 Drawing Sheets

(58) Field of Classification Search
USPC .......................................................... 345/179
See application file for complete search history.

(56) References Cited

U.S. PATENT DOCUMENTS

| | | | | |
|---|---|---|---|---|
| 2006/0181525 A1* | 8/2006 | Larsen | ................ | G06F 3/03545 |
| | | | | 345/179 |
| 2011/0175854 A1* | 7/2011 | Lien | .................... | G06F 3/03545 |
| | | | | 345/179 |

FOREIGN PATENT DOCUMENTS

| | | | |
|---|---|---|---|
| JP | 8-76914 A | | 3/1996 |
| JP | 08076914 A | * | 3/1996 |
| JP | 11059060 A | * | 3/1999 |
| JP | 2011-186803 A | | 9/2011 |
| JP | 2013-161307 A | | 8/2013 |
| JP | 2016-170640 A | | 9/2016 |
| WO | 2017/017800 A1 | | 2/2017 |

OTHER PUBLICATIONS

International Search Report, dated Feb. 12, 2019, for International Application No. PCT/JP2018/043543, 4 pages.
International Search Report, dated Feb. 12, 2019, for International Application No. PCT/JP2018/043543, 4 pages (with English translation).

* cited by examiner

ELECTRONIC PEN AND ELECTRONIC PEN MAIN BODY UNIT

BACKGROUND

Technical Field

The present disclosure relates to an electronic pen also having a function of a fountain pen as a writing tool and an electronic pen main body unit constituting the electronic pen.

Background Art

A tablet which can obtain electronic data on a character or a picture drawn on paper (data on position coordinates and a trajectory) at the same time as the character or the picture is drawn has been proposed (see Patent Document 1 (WO2017/017800), for example).

An electronic pen used in conjunction with this kind of tablet is configured to have a function of a writing tool such as a ballpoint pen or a mechanical pencil, as indicated in Patent Document 1. A user places paper on a flat surface as a coordinate detecting region of a position detecting sensor of the tablet and draws a character or a picture on the paper by a functional unit of the writing tool of the electronic pen described above. Then, the tablet detects the coordinates and trajectory of a position indicated by the electronic pen when the character or the picture is drawn on the paper, and retains electronic data on the coordinates and trajectory of the position indicated by the electronic pen. This kind of tablet can thereby obtain the electronic data on the character or the picture drawn on the paper.

PRIOR ART DOCUMENT

Patent Document

Patent Document 1: WO2017/017800

BRIEF SUMMARY

Technical Problems

A fountain pen is also steadfastly used as a writing tool for drawing on paper. Characteristics of the fountain pen include the following.
 Liquid ink is used
 A pen tip portion is devised for drawing out the ink
 A pen body is often a metal
 Generally used in an inclined state The above-described characteristics of the fountain pen are poorly compatible with the electronic pen, as will be described in the following. Conventionally, there have hardly been concrete proposals for a case where the function of the fountain pen is incorporated into the electronic pen.

Specifically, the pen tip of the electronic pen is provided with an electronic part (for example, a coil in the case of an electromagnetic induction system) that interacts with the position detecting sensor. However, this electronic part is sensitive to water. In addition, while a metal is often used as a pen body of the fountain pen, the interacting electronic part of the electronic pen is susceptible to effects of metals.

In addition, the fountain pen is used in an inclined state, and the electronic part for interacting with the position detecting sensor as described above needs to be disposed in the pen tip of the electronic pen. The position of the electronic part presents a problem in a case of a configuration for maintaining ease of writing by the pen body of the fountain pen in an oblique state.

It is an object of the present disclosure to provide an electronic pen that can avoid the above problems.

Technical Solution

In order to solve the above problems, there is provided an electronic pen including a tubular casing which at least a side of an electronic pen main body unit opposite a pen tip side of the electronic pen main body unit is housed, the electronic pen main body unit including an ink writing unit including a cartridge housing liquid ink, a pen core, and a pen body, the cartridge housing liquid ink being fitted to a rear end portion of the pen core, and the pen body is fitted to the pen core so as to be superposed on the pen core in a direction orthogonal to a coupling direction of the pen core and the cartridge, an interaction circuit having an electronic part which, in operation, exchanges a signal with a tablet, and the interaction circuit being disposed on a side of the pen core opposite the pen body in the direction orthogonal to the coupling direction of the pen core and the cartridge.

In the electronic pen of the above-described configuration, the interaction circuit having the electronic part which, in operation, exchanges the signal with the tablet is disposed on the side of the pen core of the ink writing unit opposite the pen body in the direction orthogonal to the coupling direction of the pen core and the cartridge.

Hence, according to the electronic pen of the above-described configuration, the interaction circuit is disposed on the side opposite the pen body impregnated with liquid ink with the pen core interposed between the interaction circuit and the pen body. Thus, the electronic part of the interaction circuit can be made less susceptible to the liquid ink. In addition, even in a case where a core body is formed of a metal, the pen core is present between the interaction circuit and the pen body, and therefore, the interaction circuit can be made less susceptible to interference from the metal pen body.

MODES FOR CARRYING OUT THE DISCLOSURE

First Embodiment

An electronic pen and an electronic pen main body unit according to a first embodiment of the present disclosure will be described for a case of an electromagnetic induction type electronic pen, with reference to the drawings.

Figure 1:
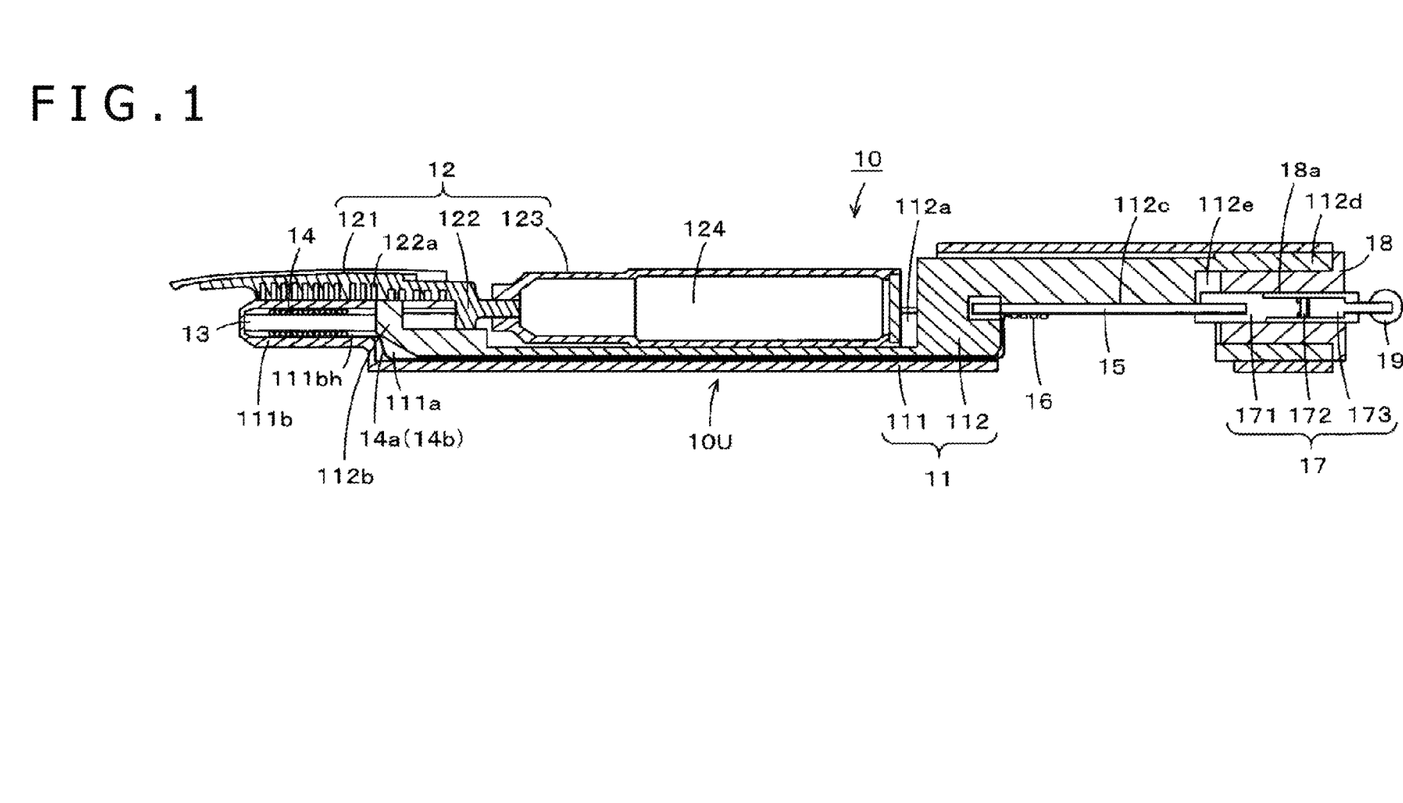
FIG. 1 is a longitudinal sectional view of assistance in explaining an example of a configuration of an electronic pen main body unit according to a first embodiment of the present disclosure.
Figure 2:
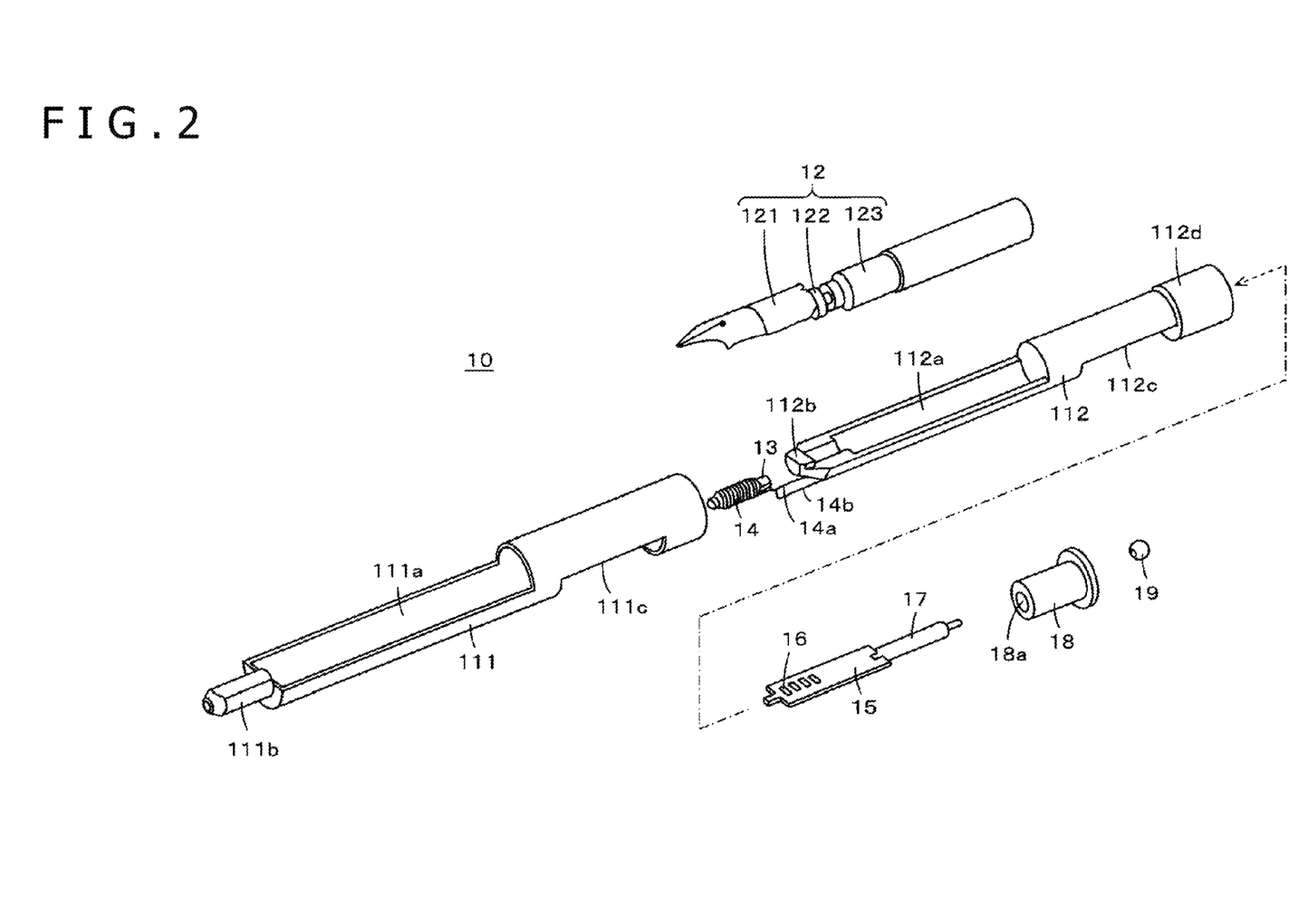
FIG. 2 is an exploded perspective view of the electronic pen main body unit according to the first embodiment of the present disclosure.

FIGS. 1 to 6B are diagrams of assistance in explaining a configuration of an electronic pen main body unit 10 used in an electronic pen according to the present first embodiment. FIG. 1 is a longitudinal sectional view of the electronic pen main body unit 10 according to the first embodiment. In addition, FIG. 2 is an exploded perspective view of parts constituting the electronic pen main body unit 10 according to the first embodiment.

As illustrated in FIGS. 1 and 2, the electronic pen main body unit 10 has a structure formed by combining, in a holder 11, an electronic pen constituent unit 10U (see FIGS. 6A and 6B) in which electronic pen constituent parts (electronic parts) constituting an electronic pen functional unit are arranged with an ink writing unit 12 for implementing a function of a fountain pen.

The ink writing unit 12 has a configuration of a pen tip side of a well-known fountain pen. In the present example, the ink writing unit 12 is formed by providing a metallic pen body 121 superposed on a pen core 122 having an ink groove 122a and fitting an ink cartridge 123 to the pen core 122. An inner space of the ink cartridge 123 is filled with liquid ink 124.

The ink cartridge 123 is coupled to a rear end side of the pen core 122 in an axial direction of the electronic pen according to the present embodiment (which axial direction will hereinafter be referred to simply as an axial direction). Then, the pen body 121 is disposed so as to be superposed on the pen core 122 in a direction orthogonal to the axial direction in a state in which a front end (pen tip) of the pen body 121 projects in the axial direction from a front end of the pen core 122 in the axial direction.

As is well known, the ink 124 filled into the ink cartridge 123 is supplied to the pen body 121 through the pen core 122, and a character or a picture can be drawn by bringing the front end of the pen body 121 into contact with paper and moving the front end of the pen body 121. Incidentally, the ink cartridge 123 is detachable from the pen core 122. Thus, the ink cartridge 123 can be removed from the pen core 122 and replaced.

Figures 3A, 3B, 3C:
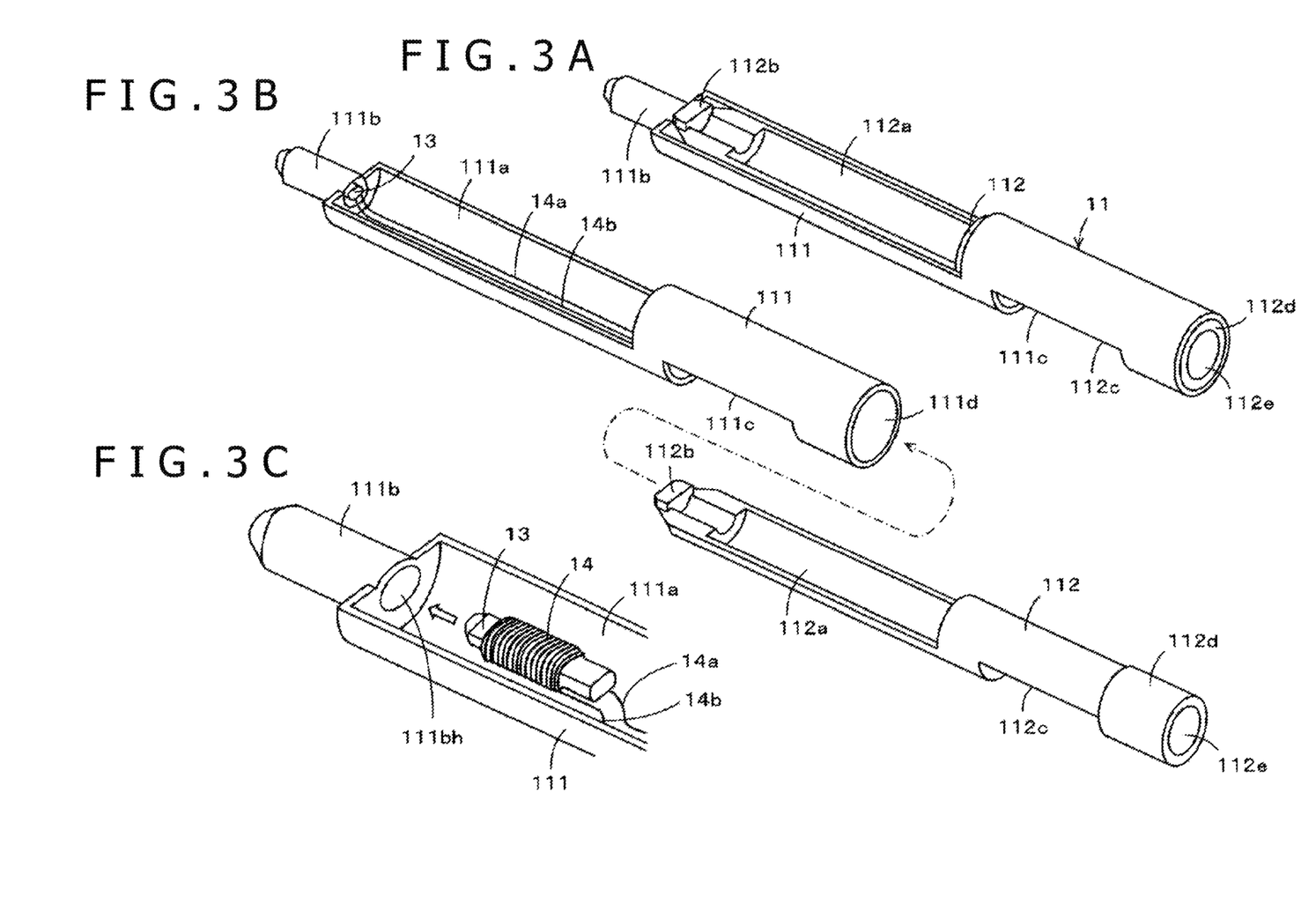
FIGS. 3A, 3B, and 3C depicts diagrams of assistance in explaining a configuration of a part of the electronic pen main body unit according to the first embodiment of the present disclosure.

As illustrated in FIGS. 1, 2, 3A, 3B, and 3C, in the present embodiment, the holder 11 is formed of an insulative material, for example, a resin, and is formed by a first holder 111 and a second holder 112, which are coupled to each other in the axial direction. FIG. 3A is a perspective view of a state in which the first holder 111 and the second holder 112 are coupled to each other. FIG. 3B is an exploded perspective view depicting the first holder 111 and the second holder 112 in a disassembled state. FIG. 3C is an enlarged perspective view of a pen tip side of the first holder 111. In the present example, the holder 11 is formed by inserting the second holder 112 into the first holder 111 in the axial direction and thus coupling the first holder 111 and the second holder 112 to each other.

The holder 11 houses and retains the ink writing unit 12 and houses and retains electronic parts constituting the electronic pen functional unit. The electronic parts of the electronic pen main body unit 10 in the present embodiment include a magnetic core or a coil 14 wound around a ferrite core 13 in the present example, a printed circuit board 15, a capacitor 16 disposed on the printed circuit board 15 and electrically connected with the coil 14 in parallel to form a parallel resonance circuit, and a pen pressure detector 17.

As illustrated in FIGS. 1 to 3C, an ink writing unit housing portion 112a housing the part of the ink cartridge 123 and a part of the pen core 122 of the ink writing unit 12 is formed on a pen tip side of the second holder 112 in the axial direction. The ink writing unit housing portion 112a has a half-pipe shape formed such that a cylinder is longitudinally divided in half.

As illustrated in FIGS. 1 to 3C, the first holder 111 has a tubular shape into which the second holder 112 can be inserted in the axial direction. Then, the pen tip side of the first holder 111 in the axial direction is provided with a recessed portion 111a having a half-pipe shape formed such that a cylinder is longitudinally divided in half, to make it possible to expose the ink writing unit housing portion 112a of the second holder 112 on the outside.

Hence, as illustrated in FIG. 3A, the ink writing unit housing portion 112a of the second holder 112 is exposed on the outside in a state in which the second holder 112 is coupled to the first holder 111. As will be described below, the ink cartridge 123 and a part of the pen core 122 of the ink writing unit 12 can be housed from the direction orthogonal to the axial direction. When the ink writing unit 12 is housed in the ink writing unit housing portion 112a, the pen body 121 and a part of the pen core 122 are not housed in the ink writing unit housing portion 112a and project to the pen tip side.

The coil 14 wound around the ferrite core 13 is preferably disposed to the pen tip side as far as possible in order to be electromagnetically coupled to and interact with a position detecting sensor. In the present embodiment, as illustrated in FIGS. 1 to 3C, a housing portion 111b for housing the coil 14 wound around the ferrite core 13 is formed in the first holder 111 so as to project to the pen tip side in the axial direction from a front end portion of the recessed portion 111a in the half-pipe shape.

As illustrated in FIGS. 1 and 3C, the housing portion 111b of the first holder 111 has a recessed hole 111bh having a depth corresponding to the length of the ferrite core 13 in the axial direction. As indicated by an arrow in FIG. 3C, the ferrite core 13 wound with the coil 14 is inserted and housed into the recessed hole 111bh of the housing portion 111b of the first holder 111.

In this case, as illustrated in FIG. 3B, lead wires 14a and 14b of both ends of the coil 14 are formed so as to be drawn out from the housing portion 111b to the inside of the recessed portion 111a of the first holder. As will be described below, a capacitor constituting a resonance circuit together with the coil 14 is connected to the lead wires 14a and 14b between them. Hence, in the present embodiment, an interaction circuit of the electronic pen main body unit 10 is formed by housing the ferrite core 13 wound with the coil 14 into the housing portion 111b.

A closing portion 112b that closes at least a part of the recessed hole 111bh of the housing portion 111b of the first holder 111 which part is on an opening side of the recessed portion 111a, when the second holder 112 is inserted into and coupled to the first holder 111, is formed in a front end portion of the second holder 112 in the axial direction. In this case, as illustrated in FIG. 1, the closing portion 112b of the second holder 112 is formed such that a gap is provided on a side opposite the opening side of the recessed portion 111a between the closing portion 112b of the second holder 112 and the recessed hole 111bh of the housing portion 111b of the first holder 111. The lead wires 14a and 14b of both ends of the coil 14 can be drawn out to a bottom portion of the recessed portion 111a through the gap. Then, as illustrated in FIG. 1, a space is formed between a bottom portion of an inner wall surface of the recessed portion 111a of the first holder 111 and an outer circumferential wall of a bottom portion of the ink writing unit housing portion 112a of the second holder 112. The lead wires 14a and 14b of both ends of the coil 14 are routed in this space.

As illustrated in FIGS. 1 to 5, a board mounting portion 112c for mounting the printed circuit board 15 is formed in the second holder 112 on a side opposite the pen tip side in the axial direction as compared to the ink writing unit housing portion 112a. The board mounting portion 112c is formed in such a shape that a semi-cylindrical part of a solid cylindrical portion in the second holder 112 is cut off, the semi-cylindrical part being on a side opposite the opening side of the ink writing unit housing portion 112a in the direction orthogonal to the axial direction. The part of the board mounting portion 112c on which the printed circuit board 15 is mounted has a planar shape, as illustrated in FIG. 1.

Figures 4A, 4B:
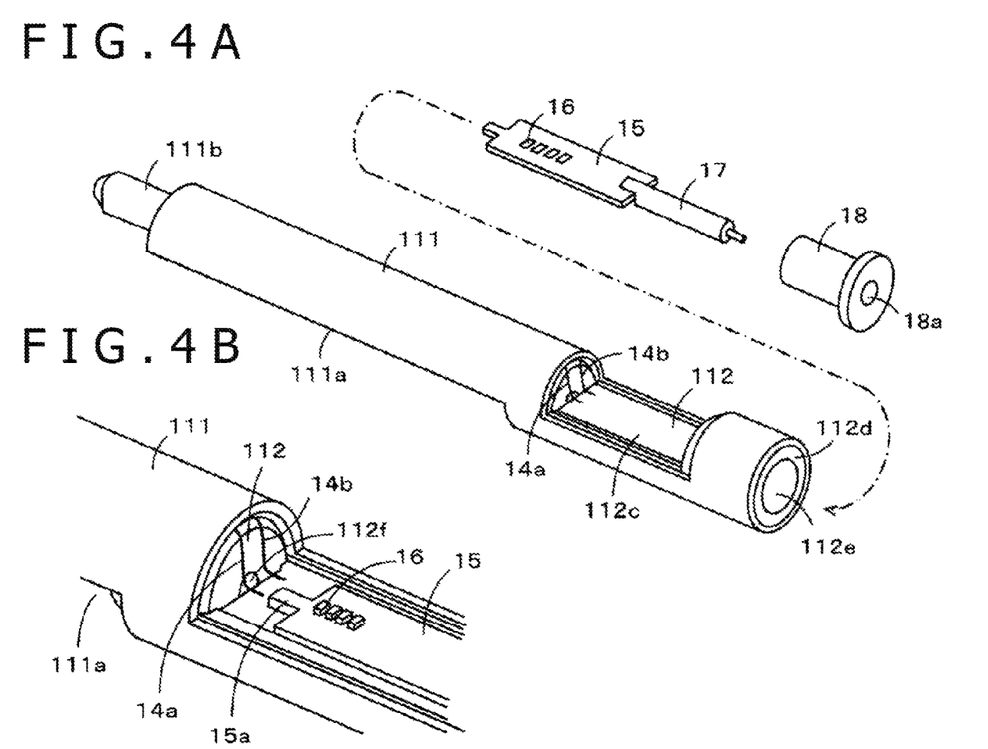
FIGS. 4A and 4B depict diagrams of assistance in explaining a configuration of a part of the electronic pen main body unit according to the first embodiment of the present disclosure.
Figure 5:
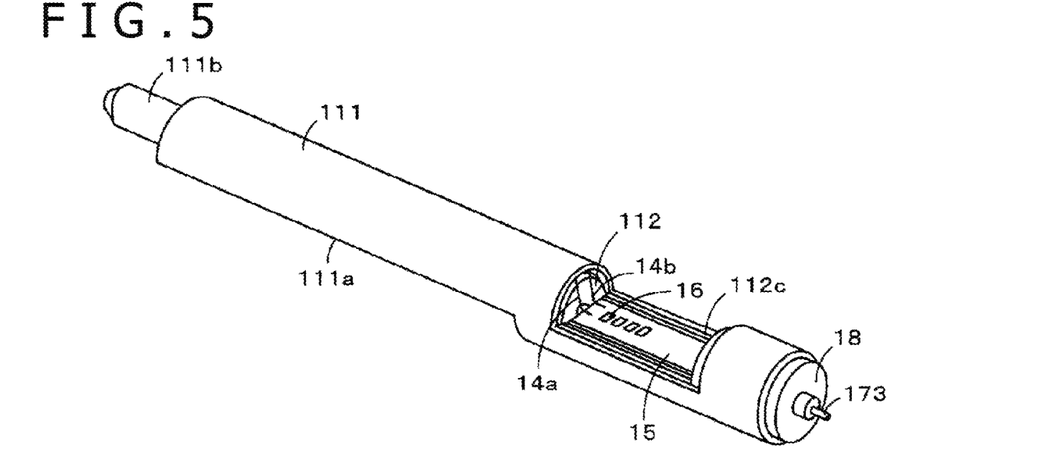
FIG. 5 is a diagram of assistance in explaining an example of a configuration of an electronic pen constituent unit of the electronic pen main body unit according to the first embodiment of the present disclosure.

Incidentally, FIG. 4A is a view of the holder 11 as viewed from the side opposite the opening side of the recessed portion 111a of the first holder 111. FIG. 4B is an enlarged view of the part of the board mounting portion 112c. In addition, FIG. 5 is a perspective view depicting a state in which the printed circuit board 15 is mounted on the board mounting portion 112c of the second holder 112 of the holder 11.

As illustrated in FIGS. 1 to 3C, a part of the tubular first holder 111 which part is in a position to which the board mounting portion 112c corresponds when the second holder 112 is inserted in and coupled to the first holder 11 is a notch portion 111c notched in a half-pipe shape so that the board mounting portion 112c is exposed on the outside from the first holder 111 as well.

A side of the second holder 112 opposite the pen tip side in the axial direction as compared to the board mounting portion 112c is a rear end portion 112d of the second holder 112. As illustrated in FIGS. 1 to 3C, the rear end portion 112d is formed in a tubular shape so as to have a cylindrical space 112e communicating with the board mounting portion 112c and opens on the rear end side of the second holder 112.

In the present example, as illustrated in FIGS. 1, 2, and 4A, the pen pressure detector 17 is coupled and attached to the rear end side of the printed circuit board 15 in the axial direction. As illustrated in FIG. 1, the pen pressure detector 17 in the present example includes an attachment fixing portion 171 for being fixed to the printed circuit board 15 so as to sandwich the printed circuit board 15, a pressure sensor 172, and a pusher member 173 that applies pressure to the pressure sensor 172. The pusher member 173 projects from the pen pressure detector 17 to the outside in a state of being movable with respect to the attachment fixing portion 171 in the axial direction of the casing 2 to press the pressure sensor 172.

The pressure sensor 172 of the pen pressure detector 17 includes, for example, a pressure sensing portion using a mechanism that changes the capacitance of a variable capacitance capacitor according to the pressure (pen pressure) applied (see Patent Document (Japanese Patent Laid-Open No. 2011-186803), for example). Incidentally, it is also possible to use, as the pressure sensor 172 of the pen pressure detector 17, a pressure sensor in which the variable capacitance capacitor includes a semiconductor chip including a MEMS (MicroElectro Mechanical Systems) element (see Patent Document (Japanese Patent Laid-Open No. 2013-161307), for example). The configuration of the pen pressure detector 17 is not limited to these configuration examples and may detect the pen pressure as a change in inductance.

Then, in the present example, as illustrated in FIGS. 4A and 4B, the printed circuit board 15 in a state of being coupled with the pen pressure detector 17 is inserted from the opening of the rear end portion 112d of the second holder 112 into the cylindrical space 112e, and is fixed to the board mounting portion 112c. The opening of the cylindrical space 112e of the rear end portion 112d of the second holder 112 is closed by a lid portion 18.

The lid portion 18 has a through hole 18a in the axial direction. The lid portion 18 is press-fitted into the cylindrical space 112e of the rear end portion 112d of the second holder 112 in a state in which the lid portion 18 houses the pen pressure detector 17 in the through hole 18a. The lid portion 18 thereby closes the opening of the cylindrical space 112e. In this case, an end portion of the lid portion 18 in the axial direction that is press-fitted into the cylindrical space 112e abuts against a rear end portion of the printed circuit board 15. The position of the printed circuit board 15 in the axial direction is thereby fixed.

Then, as illustrated in FIGS. 1 and 5, a projecting portion of the pusher member 173 of the pen pressure detector 17 projects outwardly from the lid portion 18 in the axial direction. Then, in the present example, as illustrated in FIGS. 1 and 2, a fitting member 19 to be fitted to a fixing portion within a casing of an electronic pen 1 to be described below is fitted to an end of the pusher member 173.

Description will be made of a procedure of assembly of the electronic pen main body unit 10 configured as described above.

First, as illustrated in FIG. 3C, the ferrite core 13 wound with the coil 14 is inserted and housed into the housing portion 111b of the first holder 111. At this time, the lead wires 14a and 14b of both ends of the coil 14 are routed in the axial direction in a bottom portion of the recessed portion 111a of the first holder 111, and is extended to the notch portion 111c of the first holder 111 (see FIGS. 1, 3B, 4A, and 4B).

Next, as illustrated in FIG. 3B, the second holder 112 is inserted into the first holder 111 such that the ink writing unit housing portion 112a of the second holder 112 is housed into the recessed portion 111a of the first holder 111 and that the closing portion 112b at the front end of the second holder 112 in the axial direction closes the housing portion 111b of the first holder 111. At this time, as illustrated in FIG. 1, the lead wires 14a and 14b of both ends of the coil 14 are present in a space between the ink writing unit housing portion 112a and the recessed portion 111a of the first holder 111, and as illustrated in FIGS. 4A and 4B, ends of the lead wires 14a and 14b of both ends of the coil 14 are present on the board mounting portion 112c of the second holder 112.

Next, as illustrated in FIGS. 4A and 4B, the printed circuit board 15 on which the capacitor 16 is disposed and that has the pen pressure detector 17 coupled to the rear end side thereof is inserted from the opening of the cylindrical space 112e of the rear end portion 112d of the second holder 112, and is placed on the board mounting portion 112c of the second holder 112. At this time, as illustrated in FIG. 4B, the printed circuit board 15 is locked so as not to fall off the board mounting portion 112c by fitting a front end 15a of the printed circuit board 15 into a recessed hole 112f provided to the second holder 112.

Then, the lid portion 18 is press-fitted into the cylindrical space 112e of the rear end portion 112d of the second holder 112 in a state in which the pen pressure detector 17 is housed within the through hole 18a of the lid portion 18. A state as illustrated in FIG. 5 is thereby obtained.

Next, in the state illustrated in FIG. 5, the lead wires 14a and 14b of both ends of the coil 14 are soldered to the printed circuit board 15 so as to be connected with the capacitor 16 in parallel. Then, in the present example, further, lead wires drawn out from the pressure sensor 172 of the pen pressure detector 17 are soldered to the printed circuit board 15 so that the variable capacitance capacitor constituting the pen pressure detector 17 is connected with the capacitor 16 in parallel.

Figure 6A:
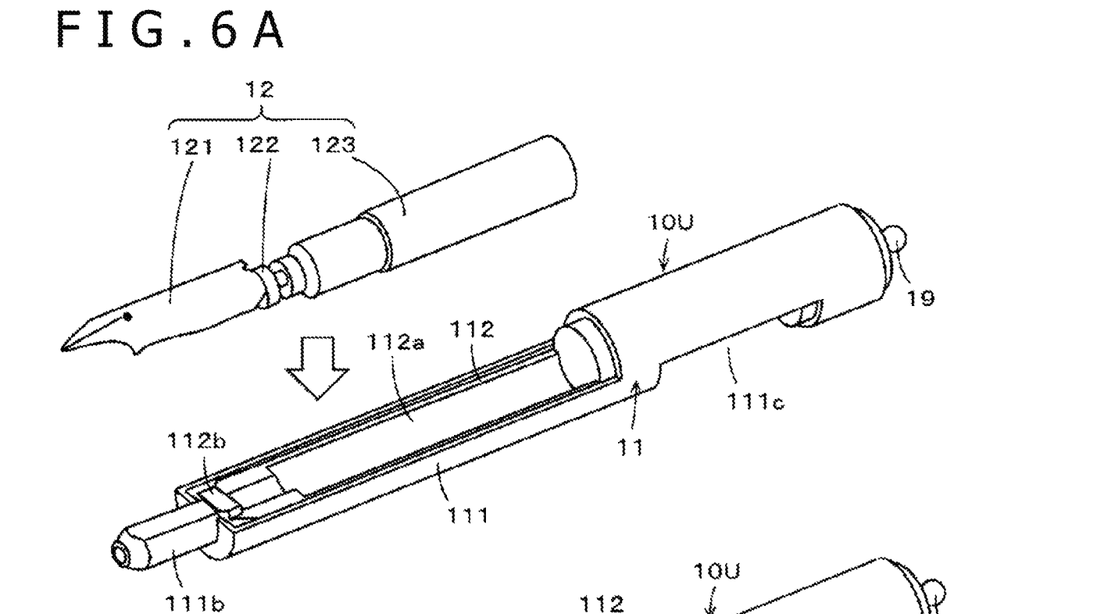
FIGS. 6A and 6B depict diagrams of assistance in explaining the configuration example of the electronic pen main body unit according to the first embodiment of the present disclosure.
Figure 6B:
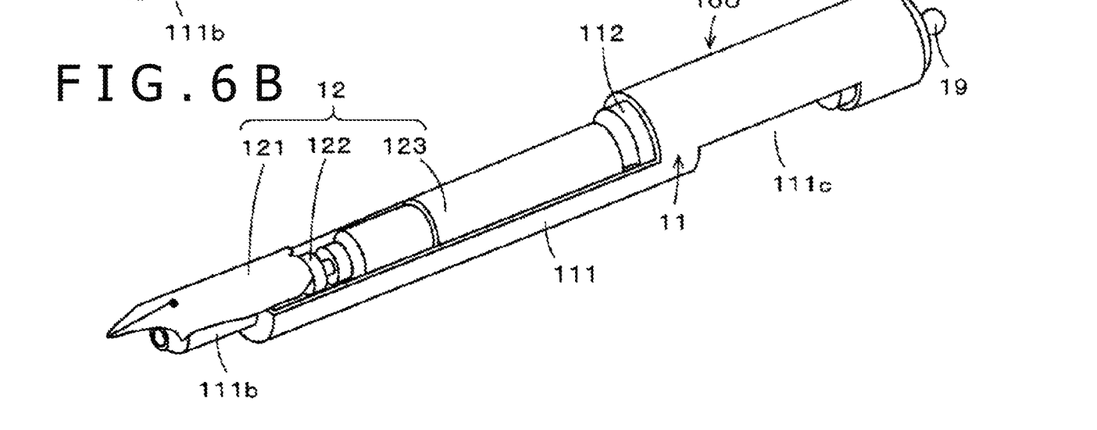

Then, the fitting member 19 is fitted to the end of the pusher member 173 of the pen pressure detector 17, the pusher member 173 projecting from the lid portion 18. The electronic pen constituent unit 10U as illustrated in FIG. 6A is thereby formed. As indicated by an arrow in FIG. 6A, the ink writing unit 12 is housed into the ink writing unit housing portion 112a of the second holder 112 of the electronic pen constituent unit 10U from the direction orthogonal to the axial direction. The electronic pen main body unit 10 according to the present embodiment as illustrated in FIG. 6B is thereby formed.

Figure 7:
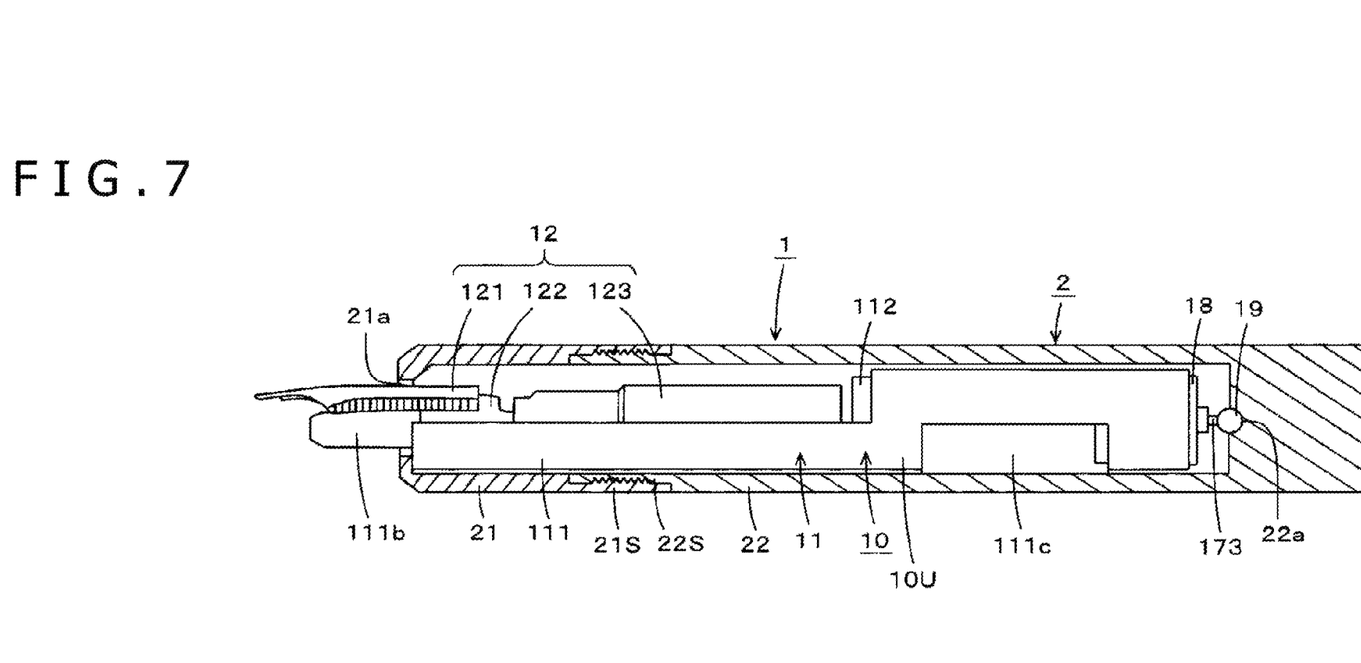
FIG. 7 is a diagram of assistance in explaining the configuration example of the electronic pen main body unit according to the first embodiment of the present disclosure.

FIG. 7 is a diagram of assistance in explaining an electronic pen 1 according to the first embodiment in which the electronic pen main body unit 10 according to the present embodiment which unit is produced as described above is housed within a tubular casing 2. FIG. 7 illustrates only the tubular casing 2 of the electronic pen 1 in section in order to facilitate understanding.

The tubular casing 2 of the electronic pen 1 according to the present embodiment includes a pen tip side casing 21 and a rear end side casing 22 and is formed by screwing together the pen tip side casing 21 and the rear end side casing 22. Specifically, as illustrated in FIG. 7, a threaded portion 21S is formed in an inner wall surface of the rear end side of the pen tip side casing 21, and a threaded portion 22S is formed in an outer circumferential surface of the pen tip side of the rear end side casing 22. The pen tip side casing 21 and the rear end side casing 22 are coupled to each other by screwing the threaded portion 21S and the threaded portion 22S together.

The pen tip side casing 21 has an opening 21a on the pen tip side. The pen tip sides of the pen body 121 and the pen core 122 of the ink writing unit 12 and the housing portion 111b of the first holder 111 of the electronic pen main body unit 10 which housing portion houses the ferrite core 13 wound with the coil 14 project from the opening 21a.

Then, as illustrated in FIG. 7, an end surface of the first holder 111 of the electronic pen main body unit 10 from which end surface the housing portion 111b projects abuts against an inner wall surface in the vicinity of the opening 21a of the pen tip side casing 21. Movement of the electronic pen main body unit 10 to the pen tip side in the axial direction within the casing 2 is thereby regulated.

In addition, as illustrated in FIG. 7, the rear end side of the rear end side casing 22 is not opened; a hollow portion on the rear end side of the rear end side casing 22 is closed, and the rear end side of the rear end side casing 22 has an inner wall surface in the direction orthogonal to the axial direction. The inner wall surface on the rear end side of the rear end side casing 22 in the direction orthogonal to the axial direction is provided with a recessed portion 22a fitted with the fitting member 19 on the rear end side of the electronic pen main body unit 10. Then, when the pen tip side casing 21 and the rear end side casing 22 are screwed and coupled together in a state of housing the electronic pen main body unit 10, the fitting member 19 of the electronic pen main body unit 10 is fitted into the recessed portion 22a of the rear end side casing 22, so that the electronic pen main body unit 10 does not rattle in the axial direction.

When pressure (pen pressure) is applied to the pen tip of the pen body 121 of the electronic pen 1, the electronic pen main body unit 10 is displaced so as to move in the axial direction according to the applied pressure. However, the position of the rear end side of the electronic pen main body unit 10 is regulated by the rear end side casing 22 of the casing 2, as described above. Thus, the displacement of the electronic pen main body unit 10 causes the pressure sensor 172 in the pen pressure detector 17 to receive a pressure same as the pressure applied to the pen tip by the pusher member 173 from a direction opposite the direction of the pressure applied to the pen tip. The pen pressure detector 17 thereby detects the pressure applied to the pen tip of the pen body 121 of the electronic pen main body unit 10.

The electronic pen main body unit 10 can be extracted from the casing 2 easily by unscrewing the pen tip side casing 21 and the rear end side casing 22 from each other in the casing 2 of the electronic pen 1. Then, the ink writing unit 12 can be detached from the ink writing unit housing portion 112a of the second holder 112 of the electronic pen constituent unit 10U in the direction orthogonal to the axial direction. Then, in the ink writing unit 12, the ink cartridge 123 can be extracted from the pen core 122 and replaced with a new ink cartridge 123. The whole of the ink writing unit 12 may of course be replaced.

Effects of Embodiment

In the electronic pen main body unit 10 according to the embodiment having the above-described configuration, the interaction circuit for exchanging signals with a tablet is formed by housing the ferrite core 13 wound with the coil 14 into the housing portion 111b, and is disposed on a side opposite the pen body 121 impregnated with the liquid ink of the ink writing unit 12 with the pen core 122 interposed between the interaction circuit and the pen body 121. Therefore, the coil 14 as an electronic part constituting the interaction circuit is separated from the pen body 121 made of a metal by the pen core 122 made of a resin and is divided by the housing portion 111b so as to be in a space separate from the ink writing unit 12. Thus, the coil 14 can be made less susceptible to effects of the pen body 121 made of a metal and can be made less susceptible to effects of the liquid ink.

Then, in the electronic pen 1 according to the present embodiment, the pen pressure detector 17 is disposed in the rear end portion of the electronic pen main body unit 10, and is configured to detect the pressure corresponding to the displacement of the electronic pen main body unit 10 in the axial direction, the whole of the electronic pen main body unit 10 being formed so as to be displaced in the axial direction according to the pressure (pen pressure) applied to the pen tip of the pen body 121. The pen pressure detector 17 can therefore surely detect the pen pressure applied to the pen tip of the pen body.

Second Embodiment

The electronic pen 1 according to the foregoing first embodiment detects the pen pressure by using the displacement of the whole of the electronic pen main body unit 10 in the axial direction within the casing 2 according to the pressure (pen pressure) applied to the pen tip of the pen body 121. However, writing by the ink writing unit 12 is considered to be often performed in a state in which a user obliquely inclines the casing 2 of the electronic pen 1 with respect to paper. Therefore, pen pressure detection may be difficult with the method based on the displacement of the electronic pen main body unit 10 in the axial direction.

An electronic pen 1B according to a second embodiment is an example in a case where an electronic pen main body unit 10B is configured to be capable of rotational displacement in a direction intersecting the axial direction within a casing 2B of the electronic pen 1B and where a pen pressure detector is configured to be able to detect a force that rotationally displaces the electronic pen main body unit 10B in the direction intersecting the axial direction, so that the pen pressure detector can detect a pressure (pen pressure) applied to the pen tip of the pen body 121 from an oblique direction, relatively well.

Figure 8A:
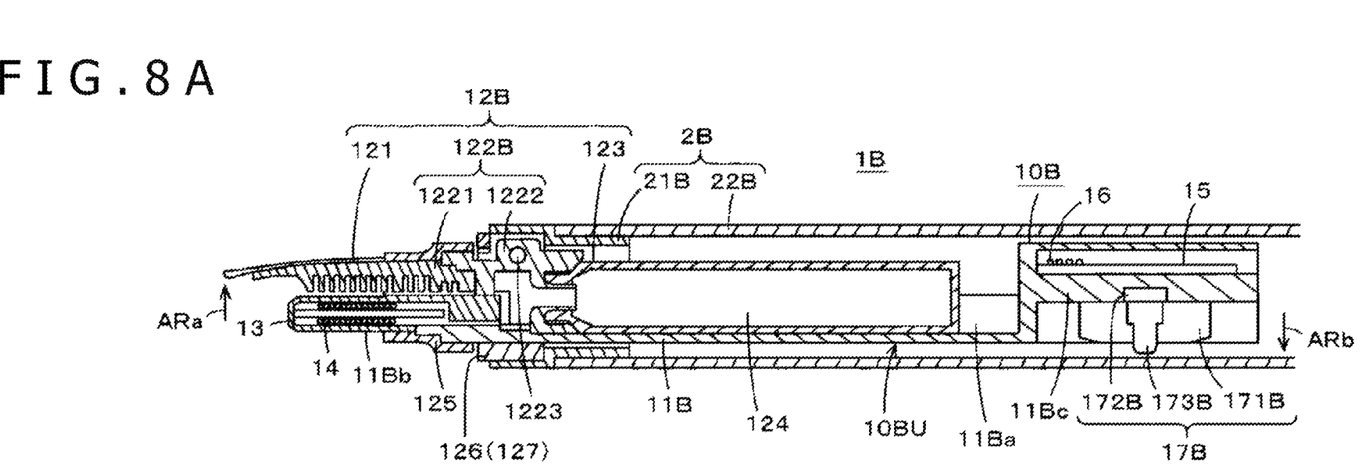
FIGS. 8A, 8B, and 8C depicts diagrams of assistance in explaining an example of a configuration of the electronic pen main body unit according to a second embodiment of the present disclosure.
Figures 8B, 8C:
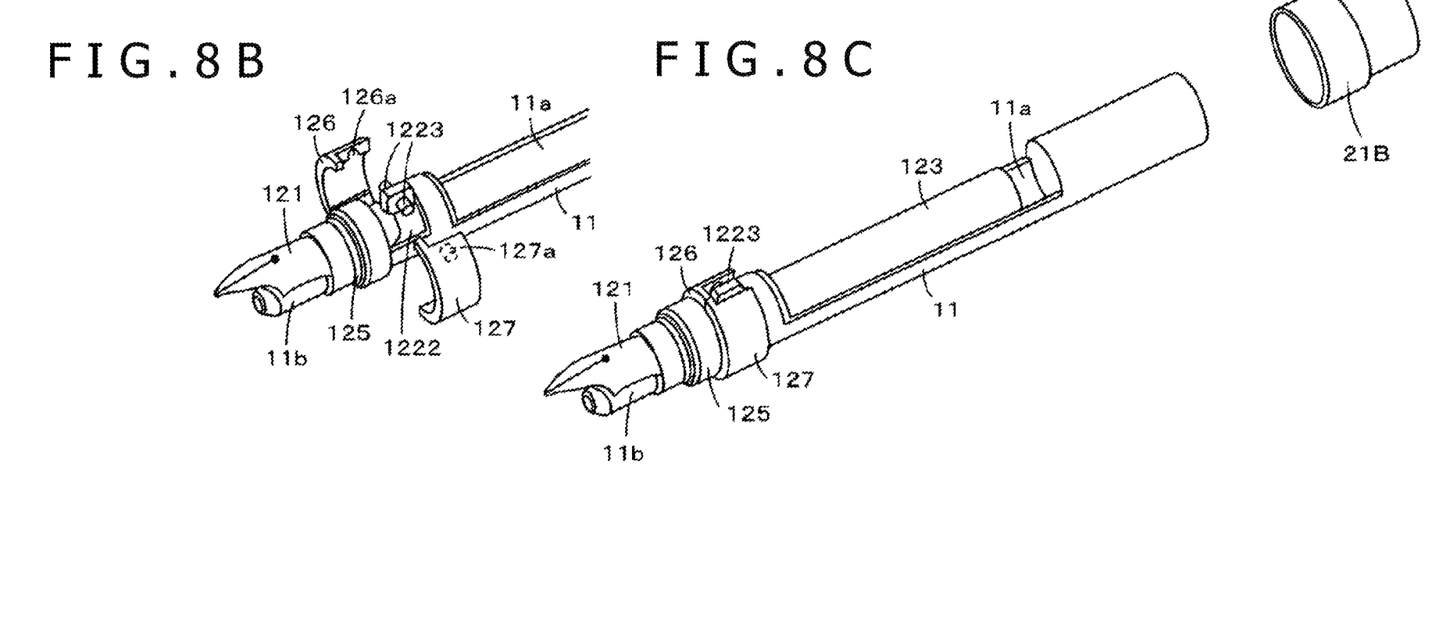

FIG. 8A is a longitudinal sectional view of assistance in explaining an example of a configuration of the electronic pen 1B according to the second embodiment. In addition, FIG. 8B and FIG. 8C are diagrams of assistance in explaining parts of the electronic pen main body unit 10B constituting the electronic pen 1B according to the second embodiment.

In an ink writing unit 12B in the second embodiment, a pen body 121 and an ink cartridge 123 are configured in a similar manner to the first embodiment, while a pen core 122B has a configuration slightly different from that of the pen core 122 according to the first embodiment.

Specifically, the pen core 122B of the ink writing unit 12B according to the second embodiment is formed by coupling a rotary shaft retaining portion 1222 to the rear end side of a pen core main body 1221. The rotary shaft retaining portion 1222 includes a rotary shaft 1223 in the direction orthogonal to the axial direction at a position shifted from a center line position of the casing of the electronic pen 1B. Then, the ink writing unit 12B is formed by detachably attaching the ink cartridge 123 to the rear end side of the rotary shaft retaining portion 1222.

An electronic pen constituent unit 10BU of the electronic pen main body unit 10B according to the second embodiment includes, as a holder 11B, an ink writing unit housing portion 11Ba in a half-pipe shape, a housing portion 11Bb constituting an interaction circuit, and a board mounting portion 11Bc on which a printed circuit board 15 is mounted.

Within the housing portion 11Bb of the electronic pen constituent unit 10BU, though not illustrated, a ferrite core 13 wound with a coil 14 is housed as in the first embodiment, and lead wires 14a and 14b of both ends of the coil 14 are arranged so as to be extended to the board mounting portion 11Bc via the ink writing unit housing portion 11Ba. Also in the present embodiment, the printed circuit board 15 having a capacitor 16 disposed thereon is mounted on the board mounting portion 11Bc, and the coil 14, the capacitor 16, and a variable capacitance capacitor formed by a pen pressure detector 17B are connected in parallel with each other on the printed circuit board 15 to form a resonance circuit.

Then, as in the first embodiment, the parts of the ink cartridge 123 and the rotary shaft retaining portion 1222 of the pen core 122B of the ink writing unit 12B are housed in the ink writing unit housing portion 11Ba of the holder 11B. At this time, in the direction orthogonal to the axial direction of the casing 2B, the housing portion 11Bb is superposed on a side of the pen core main body 1221 of the pen core 122B opposite a side where the pen body 121 is disposed.

Then, in a state in which the ink writing unit 12B is housed in the ink writing unit housing portion 11Ba of the holder 11B and the housing portion 11Bb is superposed on the pen core 122B, as described above, the ink writing unit 12B and the holder 11B are fixed by a fixing member 125. In this case, the rotary shaft retaining portion 1222 is fixed in a state in which the rotary shaft 1223 is exposed on the outside on the same side as the side of the pen core main body 1221 on which side the pen body 121 is disposed, in the direction orthogonal to the axial direction of the casing 2B.

Then, in the present embodiment, as illustrated in FIG. 8B, two bearing members 126 and 127 in a half-pipe shape cover the rotary shaft retaining portion 1222 including a part of the ink writing unit housing portion 11Ba of the holder 11B, in a state in which the bearing members 126 and 127 bearing-support the rotary shaft 1223. As illustrated in FIG. 8B, the bearing members 126 and 127 have bearing holes 126a and 127a for bearing-supporting one end portion and another end portion of the rotary shaft 1223 in the axial direction, at end edges opposed to each other in the circumferential direction of the half-pipe shapes.

Then, as illustrated in FIG. 8C, the bearing members 126 and 127 are coupled to each other so as to cover the rotary shaft retaining portion 1222 and the peripheral side surface of a part of the ink writing unit housing portion 11Ba of the holder 11B in a state in which the bearing members 126 and 127 bearing-support both ends of the rotary shaft 1223 by the bearing holes 126a and 127a. In this state, as illustrated in FIG. 8C, a pen tip side casing 21B constituting the casing 2B of the electronic pen 1B according to the second embodiment is inserted from the rear end side of the board mounting portion 11Bc of the holder 11B. As illustrated in FIG. 8A, the pen tip side casing 21B retains the coupled state of the two bearing members 126 and 127 coupled to each other.

In the second embodiment, the pen pressure detector 17B is attached to the holder 11B so as to detect pressure in a direction intersecting the axial direction. Specifically, the pen pressure detector 17B used in the second embodiment has a configuration similar to that of the pen pressure detector 17 according to the first embodiment. The pen pressure detector 17B includes an attachment fixing portion 171B attached and fixed to a surface of an underside of the board mounting portion 11Bc of the holder 11B, a pressure sensor 172B, and a pusher member 173B that applies pressure to the pressure sensor 172B. The pusher member 173B projects from the pen pressure detector 17B to the outside in a state of being movable with respect to the attachment fixing portion 171B in the direction orthogonal to the axial direction of the casing 2B to press the pressure sensor 172B.

Then, as illustrated in FIG. 8A, a rear end side casing 22B constituting the casing 2B is coupled to the pen tip side casing 21B in the axial direction in a state of housing the whole of the holder 11B in the axial direction. At this time, the pusher member 173B of the pen pressure detector 17B projects outward from the pen pressure detector 17B in a state of being movable with respect to the attachment fixing portion 171 in the direction orthogonal to the axial direction of the casing 2B. Therefore, as illustrated in FIG. 8A, an end of the pusher member 173B of the pen pressure detector 17B is in contact with an inner circumferential side wall surface of the rear end side casing 22B of the casing 2B.

When pressure is applied to the pen tip of the pen body 121 of the ink writing unit 12B of the thus configured electronic pen 1B according to the second embodiment in the direction of an arrow Ara in FIG. 8A, the rear end side of the electronic pen main body unit 10B rotates in the direction indicated by an arrow Arb with the rotary shaft 1223 as a rotational center. The pusher member 173B of the pen pressure detector 17B is thereby pressed against the inner wall surface of the rear end side casing 22B of the casing 2B by a force corresponding to the pressure applied to the pen tip of the pen body 121. Therefore, the pusher member 173B of the pen pressure detector 17B receives a reaction force from the inner circumferential side wall surface of the rear end side casing 22B and applies pressure to the pressure sensor 172B. The pen pressure detector 17B thus detects the pressure corresponding to the pressure applied to the pen tip of the pen body 121.

Hence, the electronic pen 1B according to the second embodiment provides actions and effects similar to those of the electronic pen 1 according to the foregoing first embodiment and produces an effect of being able to excellently detect, by the pen pressure detector 17B, the pressure applied to the pen tip of the pen body 121 of the ink writing unit 12B generally used in an inclined state.

Incidentally, it is needless to say that the configuration for making it possible to detect the pressure in the direction orthogonal to the axial direction by the pen pressure detector 17B with the electronic pen main body unit 10B configured to be rotatable in the direction orthogonal to the axial direction with respect to the casing 2B of the electronic pen 1B is not limited to the above-described configuration using the rotary shaft 1223, and can be various configurations.

Third Embodiment

The electronic pen 1 according to the foregoing first embodiment detects the pen pressure by the pen pressure detector 17 on the basis of the pressure in the axial direction of the casing 2, and the electronic pen 1B according to the second embodiment detects the pen pressure by the pen pressure detector 17B on the basis of the pressure in the direction orthogonal to the axial direction of the casing 2B. However, the actual pen pressure is a resultant force of the pressure in the axial direction of the casing and the pressure in the direction orthogonal to the axial direction when the electronic pen is used in an inclined state.

In view of this, a third embodiment provides an electronic pen 1C including, as pen pressure detecting means, a pen pressure detector 17C having a configuration similar to that of the pen pressure detector 17 of the electronic pen according to the first embodiment, in addition to the pen pressure detector 17B of the electronic pen 1B according to the second embodiment.

Figure 9:
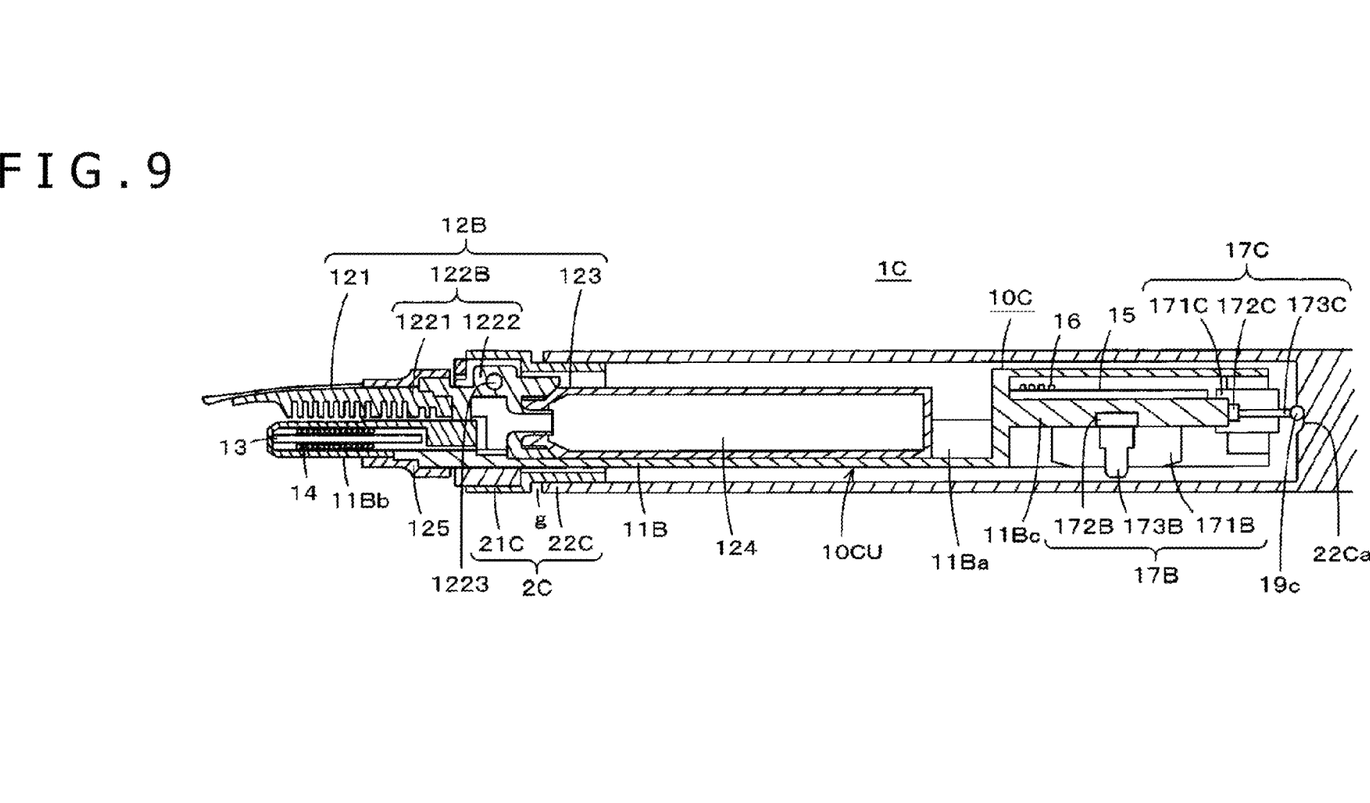
FIG. 9 is a diagram of assistance in explaining an example of a configuration of the electronic pen main body unit according to a third embodiment of the present disclosure.

FIG. 9 is a sectional view depicting an example of a configuration of the electronic pen 1C according to the present third embodiment. This figure corresponds to FIG. 8A for describing the configuration example of the electronic pen 1B according to the second embodiment. In FIG. 9, the same parts as in the electronic pen 1B according to the foregoing second embodiment are identified by the same reference numerals, and description thereof will be omitted.

In the electronic pen 1C in the present example, as illustrated in FIG. 9, the pen pressure detector 17C that detects pressure in the axial direction of a casing 2C is provided on the rear end side of the board mounting portion 11Bc of the holder 11B of an electronic pen constituent unit 10CU. The pen pressure detector 17C has a configuration similar to that of the pen pressure detector 17 in the first embodiment. The pen pressure detector 17C includes an attachment fixing portion 171C for being fixed to a rear end portion of the board mounting portion 11Bc of the holder 11B, a pressure sensor 172C, and a pusher member 173C. Then, a fitting member 19C is fitted to a part of the pusher member 173C which part projects to the outside.

The casing 2C of the electronic pen 1C according to the present third embodiment includes a pen tip side casing 21C and a rear end side casing 22C as in the electronic pen 1B according to the second embodiment. The pen tip side casing 21C has the same configuration as the pen tip side casing 21B in the second embodiment. The rear end side casing 22C in the present third embodiment forms the casing 2C by being coupled to the pen tip side casing 21C. However, the rear end side of the rear end side casing 22C is not opened; a hollow portion of the rear end side of the rear end side casing 22C is closed, and the rear end side of the rear end side casing 22C has an inner wall surface in the direction orthogonal to the axial direction.

The inner wall surface in the direction orthogonal to the axial direction on the rear end side of the rear end side casing 22C is provided with a recessed portion 22Ca fitted with the fitting member 19C on the rear end side of an electronic pen main body unit 10C. Then, when the pen tip side casing 21C and the rear end side casing 22C are coupled to each other in a state of housing the electronic pen main body unit 10C, the fitting member 19C of the electronic pen main body unit 10C is fitted into the recessed portion 22Ca of the rear end side casing 22C, so that the electronic pen main body unit 10C does not rattle in the axial direction.

In the present third embodiment, as illustrated in FIG. 9, the recessed portion 22Ca of the inner wall surface in the direction orthogonal to the axial direction on the rear end side of the rear end side casing 22C is larger than the fitting member 19C so that the fitting member 19C on the rear end side of the electronic pen main body unit 10C can be displaced in the direction orthogonal to the axial direction. This is to allow the whole of the electronic pen main body unit 10C to be rotationally displaced with the rotary shaft 1223 as a rotational center in order to detect a pen pressure in the direction orthogonal to the axial direction by the pen pressure detector 17B. The size of the recessed portion 22Ca is such a size as to make it possible to detect the pen pressure in the direction orthogonal to the axial direction by the pen pressure detector 17B.

Then, in the present third embodiment, when the pen tip side casing 21C and the rear end side casing 22C are thus coupled to each other, a gap g having a sufficient length to detect the pen pressure in the axial direction occurs between the pen tip side casing 21C and the rear end side casing 22C, as illustrated in FIG. 9. This gap g is to enable the whole of the electronic pen main body unit 10C to be displaced in the axial direction with respect to the rear end side casing 22C of the casing 2C when pressure is applied to the pen tip of the pen body 121 of the ink writing unit 12B. The other configurations are similar to those of the electronic pen 1B according to the second embodiment.

In the electronic pen 1C according to the present third embodiment, when pressure is applied to the pen tip of the pen body 121 of the ink writing unit 12B, a component of the pressure in the axial direction is detected by the pen pressure detector 17C, and a component of the pressure in the direction orthogonal to the axial direction is detected by the pen pressure detector 17B. Then, in the electronic pen 1C according to the present third embodiment, as pen pressure information, the pen pressure information detected by the pen pressure detector 17C and the pen pressure information detected by the pen pressure detector 17B are transmitted to a position detecting device. Then, the position detecting device detects the pen pressure applied to the pen tip of the pen body 121 of the electronic pen 1C by synthesizing the pen pressure information detected by the pen pressure detector 17C and the pen pressure information detected by the pen pressure detector 17B (vector synthesis).

Incidentally, the electronic pen 1C may perform an operation of synthesizing the pen pressure information detected by the pen pressure detector 17C and the pen pressure information detected by the pen pressure detector 17B (vector synthesis) and transmit the synthesized pen pressure information to the position detecting device.

[Correction of Position Indicated by Electronic Pen which Position is Detected by Position Detecting Device]

In the electronic pens 1, 1B, and 1C according to the foregoing embodiments, the position of the housing portion 111b or 111Bb constituting the electromagnetic induction type interaction circuit is offset from the pen tip of the pen body 121 of the ink writing unit 12 or 12B in the direction orthogonal to the axial direction. Therefore, the coordinates of the position indicated by the electronic pen 1, 1B, or 1C which position is detected by the position detecting device are offset from the coordinates of the position indicated by the pen tip of the pen body 121 of the ink writing unit 12 or 12B.

However, in the electronic pens 1, 1B, and 1C according to the foregoing embodiments, the ink writing unit 12 or 12B and the housing portion 111b or 111Bb constituting the interaction circuit of the electronic pen constituent unit 10U or 10BU are coupled to each other, and mutual positional relation therebetween is fixed.

Accordingly, the position detecting device used in conjunction with the electronic pen 1, 1B, or 1C in the present embodiment is provided with a correcting circuit that corrects the coordinates of the detected position indicated by the electronic pen 1, 1B, or 1C on the basis of the positional relation between the ink writing unit 12 or 12B and the housing portion 111b or 111Bb constituting the interaction circuit of the electronic pen constituent unit 10U or 10BU. It is thereby possible to correctly detect the position indicated by the pen tip of the pen body 121 of the ink writing unit 12 or 12B of the electronic pen 1, 1B, or 1C in the position detecting device.

Fourth Embodiment

The electronic pens 1, 1B, and 1C according to the foregoing first to third embodiments are each applied as an electronic pen of the electromagnetic induction type. However, the present disclosure is of course not limited to the electromagnetic induction type and is also applicable to electronic pens of other types such as an electrostatic coupling type.

Figure 10:
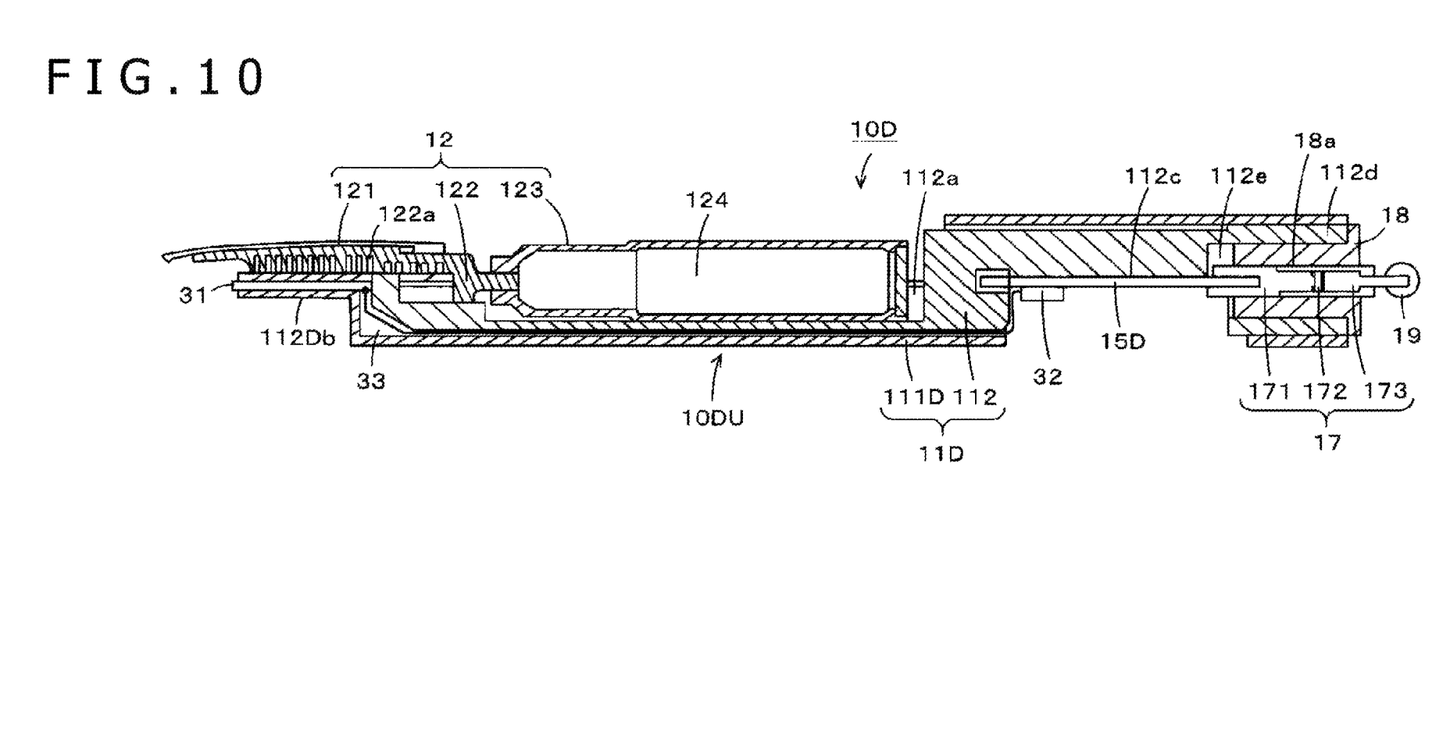
FIG. 10 is a diagram of assistance in explaining an example of a configuration of the electronic pen main body unit according to a fourth embodiment of the present disclosure.

FIG. 10 is a diagram of assistance in explaining an example of an electronic pen main body unit 10D according to a fourth embodiment in which the present disclosure is applied to an electronic pen of an active electrostatic coupling type. In the example of the electronic pen main body unit 10D illustrated in FIG. 10, the configuration of the electronic pen 1 of the electromagnetic induction type according to the first embodiment is changed to an electronic pen of the active electrostatic coupling type. The same parts as illustrated in FIG. 1 are identified by the same reference numerals, and description thereof will be omitted.

In the electronic pen main body unit 10D according to the fourth embodiment illustrated in FIG. 10, the configuration of an ink writing unit 12 is similar to that in the electronic pen 1 according to the first embodiment. The configuration of the ink writing unit 12 includes a pen body 121, a pen core 122, and an ink cartridge 123.

In the electronic pen main body unit 10D according to the present fourth embodiment, an electronic pen constituent unit 10DU has a configuration similar to that of the holder 11 of the electronic pen main body unit 10 according to the first embodiment. The electronic pen constituent unit 10DU includes a first holder 111D slightly different from the first holder 111 according to the first embodiment and a second holder 112 having a configuration similar to that in the first embodiment.

Specifically, the first holder 111D includes a housing portion 111Db superposed on the ink groove 122a side as a side opposite the pen body 121 of the pen core 122 of the ink writing unit 12, and the housing portion 111Db houses a conductive rod-shaped body 31 in place of the ferrite core 13 wound with the coil 14. The conductive rod-shaped body 31 constitutes a core body of an active electrostatic coupling type electronic pen having no writing function.

In the present example, the conductive rod-shaped body 31 is connected to a lead wire 33. The lead wire 33 is extended through a gap between the first holder 111D and the second holder 112 to a printed circuit board 15D provided on the board mounting portion 112c of the second holder 112. A signal generating circuit 32 is provided on the printed circuit board 15D. The lead wire 33 is connected to an output terminal of the signal generating circuit 32.

The other configurations are formed in a similar manner to the electronic pen 1 according to the first embodiment, including the coupling of the pen pressure detector 17 to the printed circuit board 15D.

An electronic pen 1D according to the present fourth embodiment is coupled to a position detecting device by an electrostatic coupling system and interacts with the position detecting device by transmitting a signal from the signal generating circuit 32 from the conductive rod-shaped body 31 in the housing portion 111Db. In the present example, pen pressure information detected by the pen pressure detector 17 is transmitted as a change in the frequency of the signal from the signal generating circuit 32. Incidentally, the signal from the signal generating circuit 32 may be formed as an ASK (Amplitude Shift Keying) signal and include the pen pressure information. The other operations are similar to those of the first embodiment, and actions and effects similar to those of the first embodiment are produced.

Other Embodiments or Modifications

In the foregoing embodiments, the pen pressure information is transmitted from the electronic pen to the position detecting device by means for interacting with the position detecting device by the electromagnetic induction system or the electrostatic coupling system. However, the electronic pen and the position detecting device may be provided with a wireless communication circuit based on a short-range wireless communication system, for example, and the pen pressure information may be transmitted separately through the wireless communication circuit.

DESCRIPTION OF REFERENCE SYMBOLS 1, 1B, 1C, 1D . . . Electronic pen, 2, 2B, 2C . . . Casing, 10, 10B, 10C, 10D . . . Electronic pen main body unit, 10U, 10DU . . . Electronic pen constituent unit, 11, 11B, 11C, 11D . . . Holder, 12, 12B . . . Ink writing unit, 13 . . . Ferrite core, 14 . . . Coil, 15 . . . Printed circuit board, 16 . . . Capacitor, 17, 17B, 17C . . . Pen pressure detector, 111a . . . Ink writing unit housing portion, 111b . . . Housing portion, 121 . . . Pen body, 122, 122B . . . Pen core, 123 . . . Ink cartridge

The invention claimed is:

1. An electronic pen main body unit comprising:
an ink writing unit including a cartridge housing liquid ink, a pen core, and a pen body, the cartridge being fitted to an end portion of the pen core, and the pen body being disposed adjacent to a side of the pen core in a direction orthogonal to a coupling direction of the pen core and the cartridge; and
an interaction circuit having an electronic part which, in operation, exchanges a signal with a tablet,
the interaction circuit being disposed on a side of the pen core opposite the side of the pen core adjacent to the pen body in the direction orthogonal to the coupling direction of the pen core and the cartridge.

2. The electronic pen main body unit according to claim 1, wherein:
a writing end of the pen body is farther away from the cartridge than the interaction circuit in the coupling direction of the pen core and the cartridge.

3. The electronic pen main body unit according to claim 1, wherein:
the electronic part of the interaction circuit is configured to be present in a space partitioned from the ink writing unit by a predetermined member.

4. The electronic pen main body unit according to claim 1, wherein
the electronic part of the interaction circuit includes a coil wound around a magnetic core.

5. The electronic pen main body unit according to claim 1, wherein
the electronic part of the interaction circuit includes a rod-shaped conductor that sends out the signal.

6. The electronic pen main body unit according to claim 1, comprising:
a holder, at least a side of the holder opposite a pen tip side of the holder being housed within a tubular casing of an electronic pen, wherein an electronic part housing portion that houses the electronic part of the interaction circuit and projects to the pen tip side of the holder is disposed on a pen tip side of the electronic pen in the holder.

7. The electronic pen main body unit according to claim 6, wherein:
the holder includes an ink writing unit housing portion configured to house the ink writing unit from a direction orthogonal to an axial direction of the electronic pen, and
the ink writing unit is housed in the ink writing unit housing portion in a state in which a side of the pen core opposite the pen body faces the electronic part housing portion.

8. The electronic pen main body unit according to claim 6, wherein:
the holder has a printed circuit board in a part housed within the casing of the electronic pen, the printed circuit board being mounted with a part electrically connected to the electronic part housed in the electronic part housing portion.

9. The electronic pen main body unit according to claim 1, comprising:
a holder, at least a side of the holder opposite a pen tip side of the holder being housed within a tubular casing of an electronic pen,
wherein the holder includes an ink writing unit housing portion configured to house the ink writing unit from a direction orthogonal to an axial direction of the electronic pen.

10. The electronic pen main body unit according to claim 1, comprising:
a holder, at least a side of the holder opposite a pen tip side of the holder being housed within a tubular casing of an electronic pen,
wherein the holder includes a first holder including an electronic part housing portion on a pen tip side of the electronic pen, the electronic part housing portion housing the electronic part of the interaction circuit and projecting to the pen tip side of the holder, and a second holder including an ink writing unit housing portion configured to house the ink writing unit from a direction orthogonal to an axial direction of the electronic pen, and the electronic part housing portion and the ink writing unit housing portion are formed as separate spaces by coupling the first holder and the second holder to each other in the axial direction of the electronic pen.

11. The electronic pen main body unit according to claim 1, comprising:
a holder on which the interaction circuit is disposed,
wherein a pen pressure detector is disposed on a side of the holder that is opposite a side of the holder including the interaction circuit in the coupling direction of the pen core and the cartridge, and
the pen pressure detector includes an engaging portion that engages with a fixed part within a casing of an electronic pen and receives a force occurring between the pen pressure detector and the casing, and detects the force applied to the engaging portion when the electronic pen main body unit is displaced according to a pressure applied to a front end of the pen body.

12. The electronic pen main body unit according to claim 11, wherein:
the engaging portion of the pen pressure detector is formed so as to engage with the part fixed within the casing of the electronic pen in the coupling direction of the pen core and the cartridge, and
the electronic pen main body unit is configured to be displaced in the coupling direction of the pen core and the cartridge within the casing of the electronic pen according to the pressure applied to the front end of the pen body.

13. The electronic pen main body unit according to claim 11, wherein:
the engaging portion of the pen pressure detector is formed so as to engage with the casing of the electronic pen in the direction orthogonal to the coupling direction of the pen core and the cartridge, and the electronic pen main body unit is configured to be displaced in a direction intersecting the coupling direction of the pen core and the cartridge within the casing of the electronic pen according to the pressure applied to the front end of the pen body.

14. The electronic pen main body unit according to claim 13, comprising:
a pivot on which the electronic pen main body unit rocks so as to be displaced in the direction intersecting the coupling direction of the pen core and the cartridge within the casing of the electronic pen.

15. The electronic pen main body unit according to claim 1, wherein
the ink writing unit is detachable.

16. The electronic pen main body unit according to claim 15, wherein:
the cartridge of the ink writing unit is replaceable.

17. An electronic pen comprising:
an electronic pen main body unit; and
a tubular casing in which at least a side of the electronic pen main body unit opposite a pen tip side of the electronic pen main body unit is housed,
the electronic pen main body unit including:
an ink writing unit including a cartridge housing liquid ink, a pen core, and a pen body, the cartridge being fitted to an end portion of the pen core, and the pen body being disposed adjacent to a side of the pen core in a direction orthogonal to a coupling direction of the pen core and the cartridge, and
an interaction circuit having an electronic part which, in operation, exchanges a signal with a tablet,
the interaction circuit being disposed on a side of the pen core opposite the side of the pen core adjacent to the pen body in the direction orthogonal to the coupling direction of the pen core and the cartridge.

18. The electronic pen according to claim 17, comprising:
a holder on which the interaction circuit is disposed,
wherein the electronic pen main body unit includes a pen pressure detector on a side of the holder opposite a side of the holder including the interaction circuit in the coupling direction of the pen core and the cartridge, and
the pen pressure detector includes an engaging portion that engages with a part fixed within the casing and receives a force occurring between the pen pressure detector and the casing, and detects the force applied to the engaging portion when the electronic pen main body unit is displaced according to a pressure applied to a front end of the pen body.

19. The electronic pen according to claim 18, wherein:
the engaging portion of the pen pressure detector is formed so as to engage with the part fixed within the casing in the coupling direction of the pen core and the cartridge, and
the electronic pen main body unit is configured to be displaced in the coupling direction of the pen core and the cartridge within the casing according to the pressure applied to the front end of the pen body.

20. The electronic pen according to claim 18, wherein:
the engaging portion of the pen pressure detector is formed so as to engage with the part fixed within the casing in the direction orthogonal to the coupling direction of the pen core and the cartridge, and
the electronic pen main body unit is configured to be displaced in a direction intersecting the coupling direction of the pen core and the cartridge within the casing according to the pressure applied to the front end of the pen body.

* * * * *